Patented Jan. 17, 1950

2,495,008

UNITED STATES PATENT OFFICE 2,495,008

ADHESIVE TAPE

Clark M. Keaton, Seattle, Wash., assignor to American-Marietta Company, Seattle, Wash., a corporation of Illinois No Drawing. Application January 18, 1947, Serial No. 722,973

3 Claims. (Cl. 117—68.5)

The present invention relates to adhesive tape and, in more particular, to a backing for pressure-sensitive adhesive and the combination of such a backing with a pressure-sensitive adhesive.

In the prior art, there have been many pressure-sensitive adhesives applied to surfaces, such as paper, which require that another surface, a back surface, to be brought into contact with the pressure-sensitive surface, be treated, so that the two surfaces may be separated without damage to either surface, or without the transfer of the pressure-sensitive adhesive to the other, or back surface. This desideratum requires that the back surface be treated with a material, usually called a backing.

The backing of the present invention is thermoplastic and comprises a base, a plasticizer, and a lubricant. These elements must be compatible with each other.

The base must have a softening and melting point capable of easy achievement and yet not so low as to be affected by the ordinary temperatures found in commerce. Applicant's base has a softening point close to that of the boiling point of water, but a flash point which is very much higher. The base must not penetrate into the paper, but must adhere very closely thereto without being brittle and flaking off.

The base must spread easily so as to form a very thin film on the paper. The base which applicant uses does not degrade the ordinary pressure-sensitive adhesive. The plasticizer increases the flexibility of the base without changing its other characteristics. The lubricant is used to increase somewhat the flow of the base, to give it a small degree of slipperiness, and to decrease any tendency of the pressure-sensitive adhesive to form a permanent bond with the backing, that is, the backing is non-blocking to the adhesive.

Applicant has found that the polyamide resins form good bases. A polyamide resin is a polymerization product of a carboxylic acid, e. g., adipic acid, and its aminated derivatives. The particular polyamide which applicant has found especially desirable is an ethylene diamine polyamide of dimerized and trimerized linoleic and linolenic acids, such as the polyamide resin; series ED, solvent type (No. 93) or hot melt uncompounded, manufactured by General Mills, Inc., 2010 East Hennepin Avenue, Minneapolis, Minn. Several of the diamine polyamids of polymerized octadecaienoic acids may be used beside the ethylene diamine above named.

Applicant has found a suitable plasticizer is an ethylene glycol ester of a rosin in which portions of the unsaturated acids have been reacted with each other through their double bond to form polymers to the extent of 40% of the normal constituents of the rosin. Applicant has used such a processed rosin which has a softening point of about 80° C. and a very high flash point, 218° C. Polypale Ester No. 1 manufactured by the Hercules Powder Co. is such a suitable plasticizer. Other such glycol esters are suitable.

As a lubricant, applicant has used ordinary paraffine wax, with a melting point of about 650° C. This is a true, or mineral wax, which consists of esters of higher hydroxyalcohols and higher hydrocarbons.

A backing made in accordance with the above formulation will flow easily and thinly onto most types of paper, with very little penetration but good adhesion and flexibility, and will not be degraded by nor degrade the pressure-sensitive adhesive. Usually this backing is flowed on at a temperature near, or slightly above, the boiling point of water.

The type of pressure-sensitive adhesive which applicant has found highly successful, particularly in combination with his new backing, is one employing as its principal ingredients the reaction products of the acids in hydrogenated rosin and glycerine, in combination with a methacrylate synthetic latex. Such reaction products are the staybelite esters, manufactured by Hercules Powder Co., and such methacrylate synthetic resin is the MH9-21A, manufactured by American Resinous Products Company.

A preferred formulation for the backing is given below:

Backing

| | Per cent |
|---|---|
| Polyamide resin (solvent type) | 45.5 |
| Polypale ester No. 1 | 45.5 |
| Paraffin Wax (M. P. 145) | 9.0 |
| | 100 |

The patent to Julius G. Little, No. 2,382,731, August 14, 1945, illustrates a suitable pressure-sensitive adhesive, there being many others in the prior art.

In formulating the backing, larger amounts of the plasticizer give stickiness and increase penetration, lesser amounts of the plasticizer make the film too brittle. More of the lubricant degrades the adhesive and increases penetration. Less gives tackiness.

By the use of this backing and the described adhesive, the two may be applied simultaneously to the paper. This is a decided advantage in the manufacture of a tape. Also, a satisfactory hot-melt backing is the easiest and least expensive to apply, either separately or with the adhesive.

Having thus described my invention, I claim:

1. A thermo-plastic backing, comprising, 100 parts by weight, substantially: a glycol ester of a hydrogenated rosin 45.5 parts, a paraffin wax 9.0 parts, and diamine polyamides of polymerized octadecaienoic acids 45.5 parts.

2. A thermo-plastic backing, comprising: glycol ester of a hydrogenated rosin, a paraffin wax, and diamine polyamides of polymerized octadecaienoic acids; such elements when compounded having a melting point of 100° C., said glycol ester of a hydrogenated rosin and diamine polyamides of polymerized octadecaienoic acids being employed in substantially equal parts, and said paraffin wax being employed in an amount, relatively minor in proportion to said other ingredients, sufficient to avoid undue tackiness and insufficient to degrade the adhesive and unduly increase penetration.

3. A tape having on one face a latex-base pressure-sensitive adhesive and on the other face a thermo-plastic backing non-blocking to said adhesive; said backing comprising, 100 parts by weight, substantially: a glycol ester of a hydrogenated rosin 45.5 parts, a paraffin wax 9.0 parts, and diamine polyamides of polymerized octadecaienoic acids 45.5 parts.

CLARK M. KEATON.

REFERENCES CITED

The following references are of record in the file of this patent:

UNITED STATES PATENTS

| Number | Name | Date |
|---|---|---|
| 2,094,771 | Charch et al. | Oct. 5, 1937 |
| 2,118,101 | Nollau et al. | May 24, 1938 |
| 2,147,629 | Charch | Feb. 21, 1939 |
| 2,206,899 | Kellgren | July 9, 1940 |
| 2,347,643 | Schieman | May 2, 1944 |
| 2,365,020 | Stillwell | Dec. 12, 1944 |
| 2,365,731 | Little | Aug. 14, 1945 |

OTHER REFERENCES

Norelac, A Proposed New Synthetic Coating Material, Cowan et al.; Oil and Soap, April 1944, pages 101–107.

Polyamides from Polymeric Fat Acids, Falkenburg et al., Oil and Soap, June 1945, pages 143–148.

Polyamide Resins, A. G. Hovey, Modern Plastics, May 1945, pages 125, 126, and 192.